(12) United States Patent
Charleux

(10) Patent No.: US 9,030,833 B2
(45) Date of Patent: May 12, 2015

(54) FLEXIBLE ANNULAR PROTECTION OF A REMOTE CONTROL

(75) Inventor: Olivier Charleux, Thonon les Bains (FR)

(73) Assignee: Somfy SAS, Cluses (FR)

( * ) Notice: Subject to any disclaimer, the term of this patent is extended or adjusted under 35 U.S.C. 154(b) by 1239 days.

(21) Appl. No.: 12/909,186

(22) Filed: Oct. 21, 2010

(65) Prior Publication Data

US 2011/0122010 A1 May 26, 2011

(30) Foreign Application Priority Data

Oct. 22, 2009 (FR) ...................................... 09 57430

(51) Int. Cl.
*H05K 5/00* (2006.01)
*H01H 9/02* (2006.01)

(52) U.S. Cl.
CPC ....... *H01H 9/0242* (2013.01); *H01H 2231/032* (2013.01); *H01H 2300/03* (2013.01); *Y02B 90/224* (2013.01); *Y04S 20/14* (2013.01)

(58) Field of Classification Search
USPC ........................... 361/728–730, 752, 796, 800
See application file for complete search history.

(56) References Cited

U.S. PATENT DOCUMENTS

| | | | |
|---|---|---|---|
| D266,416 S * | 10/1982 | Hiraki | D14/218 |
| 5,243,430 A | 9/1993 | Emmons | |
| 5,931,434 A | 8/1999 | Rodriguez | |
| 8,248,791 B2 * | 8/2012 | Wang et al. | 361/679.59 |
| 8,540,205 B2 * | 9/2013 | Zhang et al. | 248/688 |
| 8,623,494 B2 * | 1/2014 | Richardson et al. | 428/156 |
| 2003/0122698 A1 * | 7/2003 | Horie et al. | 341/176 |
| 2005/0174253 A1 | 8/2005 | Altman | |
| 2006/0104059 A1 | 5/2006 | Chen | |
| 2008/0172695 A1 | 7/2008 | Migos et al. | |
| 2009/0121905 A1 * | 5/2009 | Griffin et al. | 341/35 |

FOREIGN PATENT DOCUMENTS

| | | |
|---|---|---|
| CN | 2749214 Y | 12/2005 |
| EP | 0 708 463 A | 4/1996 |
| FR | 2 724 263 A | 3/1996 |
| GB | 2333402 A | 7/1999 |
| WO | WO 2008/078087 A | 7/2008 |

OTHER PUBLICATIONS

Search Report issued by French Patent Office for priority application FR 09/57430 dated Jun. 8, 2010.

Office action issued by Chinese Patent Office for corresponding Chinese application 201010576869.2 dated Jun. 3, 2014 with English translation.

* cited by examiner

*Primary Examiner* — Hung S Bui
(74) *Attorney, Agent, or Firm* — Frommer Lawrence & Haug LLP; Ronald R. Santucci

(57) ABSTRACT

A remote control device (1, 100, 200) for home automation equipment, of the roaming type, comprising a housing (2) containing an electronic circuit (7) comprising a radiofrequency transmitter (9), said housing (2) being of substantially cylindrical or spherical shape and having an axis of revolution, wherein the device comprises a viscoelastic ring (6, 106, 206), with the same axis of revolution as that of the housing, elastically held against said housing (2) and concealing an opening (16) in said housing (2).

8 Claims, 2 Drawing Sheets

FLEXIBLE ANNULAR PROTECTION OF A REMOTE CONTROL

This application claims priority benefits from French Patent Application No. 09 57430 filed Oct. 22, 2009, the disclosure of which is hereby incorporated by reference.

BACKGROUND OF THE INVENTION

The invention relates to the field of wireless remote control for home automation equipment handling comfort and/or safety functions in a building. Such equipment includes, for example, solar protection, rolling blinds, closure, light fittings, heating or air-conditioning means, anti-fire or anti-theft alarm devices.

In order to provide the capability to control a plurality of equipment items, to activate scenarios and also save such scenarios, the control means is generally a complex device. It should generally include a sophisticated human-machine interface, of the keyboard and screen type, in order to select and save the links with different equipment items and, for the creation of a scenario, to assign to them and save a chosen configuration.

DESCRIPTION OF THE PRIOR ART

Moreover, in order to create products with a visual design that is attractive to the user, it is known, notably in the field of universal remote controls for televisions and other electronic appliances, to simplify the construction of the remote control by assigning it a limited number of control keys.

For example, the U.S. Pat. No. 5,243,430 describes a universal remote control comprising only four control keys, infrared transmitters for transmitting control signals omnidirectionally and an infrared receiver for receiving, in a learning mode, the codes transmitted by the source remote control.

In a substantially similar manner, the patent application US2005/0174253 describes a discoid-shaped remote control having a "smiley" face, fitted with a single control key.

The patent application US 2008/0172695 also describes a discoid remote control with an elliptical profile.

All these devices can be programmed from existing remote controls.

It is also known to use the facilities offered by a personal computer to serve as programming means. In this regard, the patent application WO 0039772 describes the emulation of a universal remote control on a computer screen. The real remote control is connected to the computer and the transmission of commands by the real remote control occurs when the computer mouse activates the buttons on the screen.

A roaming remote control can be connected to a computer using a USB (Universal Serial Bus) cable. These cables are in fact available with at least one small connector which can be fitted into a photographic appliance, a telephone or a roaming-type multimedia player. Thus, the remote control can be programmed from the computer, which is particularly useful if this remote control has a limited number of control keys.

To be able to use this connector, it is therefore necessary to maintain access through an opening in the housing of the remote control. Furthermore, for aesthetic reasons and to protect the contact blades of the connector, this opening is usually concealed by a removable hatch, for example fitted pivot-wise, which is not very easy to manipulate and is particularly fragile. The complexity in producing the latter increases in the case of a housing with rounded shapes. The invention resolves this problem, as well as other problems described hereinbelow, through a roaming remote control comprising a viscoelastic ring.

SUMMARY OF THE INVENTION

According to the invention, the remote control device for home automation equipment, of the roaming type, comprises a housing containing an electronic circuit comprising a radiofrequency transmitter, said housing being of substantially cylindrical or spherical shape and having an axis of revolution, the device comprising a viscoelastic ring, with the same axis of revolution as that of said housing, held elastically against said housing and concealing an opening in said housing.

According to the invention, said opening can give access to the terminals of a connector connected to said electronic circuit.

According to the invention, said housing can comprise a top shell and a bottom shell connected along a connection plane perpendicular to the axis of revolution, and control keys positioned on said top shell.

According to the invention, said viscoelastic ring can be held in a groove of revolution of said housing.

According to the invention, said viscoelastic ring can have a section including a protuberance complementing said groove of revolution.

According to the invention, said groove of revolution can be located on either side of said connection plane.

According to the invention, the outer diameter of said viscoelastic ring may be greater than the outer diameter of said housing.

According to the invention, said viscoelastic ring may have a U-shaped section covering the area of join between said top shell and said bottom shell.

According to the invention, said electronic circuit may comprise a printed antenna and said viscoelastic ring may comprise at least one conductive turn portion, constituting a secondary antenna magnetically coupled with said printed antenna.

DESCRIPTION OF THE DRAWINGS

The invention will be better understood by those skilled in the art from the detailed description of various embodiments in relation to the accompanying drawings, in which.

DESCRIPTION OF THE PREFERRED EMBODIMENTS

Figure 1:
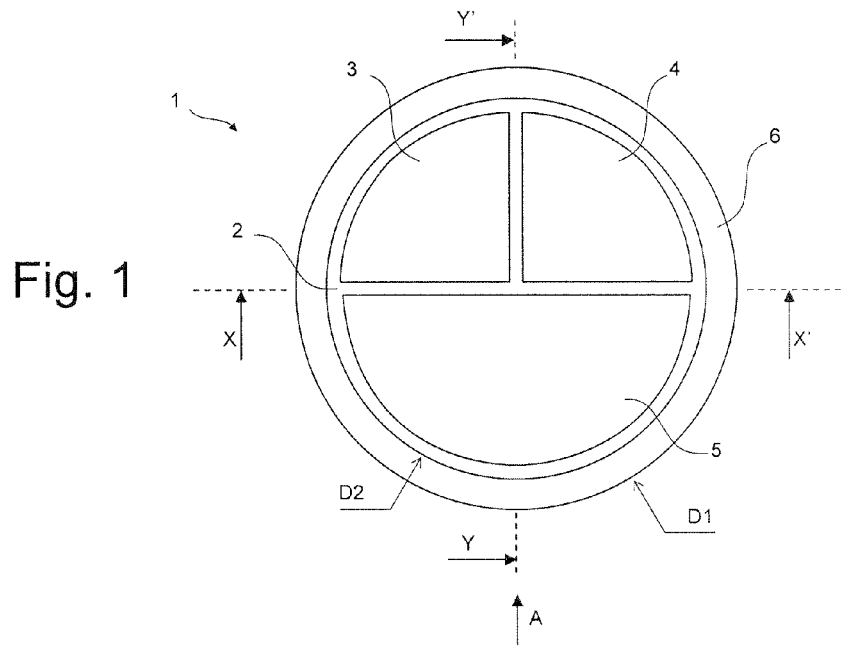
FIG. 1 shows a front view of a roaming remote control according to the invention.

FIG. 1 shows, from a front view, a roaming remote control 1 according to the invention. The roaming remote control is designed to control home automation equipment, for example lighting, closure or solar protection devices. It comprises a housing 2, of flattened spherical shape, on which are positioned a first control key 3, a second control key 4 and a third control key 5. The control keys are positioned non-symmetrically so as to enable the housing to be easily oriented in the hand, by tactile recognition. Thus, the third control key occupies roughly a half-disk whereas the first control key and the second control key each occupy roughly a quarter disk.

The viscoelastic ring 6 surrounds the housing 2. The combination of a circular ring and a housing with symmetry of revolution makes it possible to easily fit the ring without the slightest registration problem. The outer diameter D1 of the viscoelastic ring 6 is greater than the outer diameter D2 of the housing 2. The housing 2 is thus protected against any lateral impact.

Figure 2:
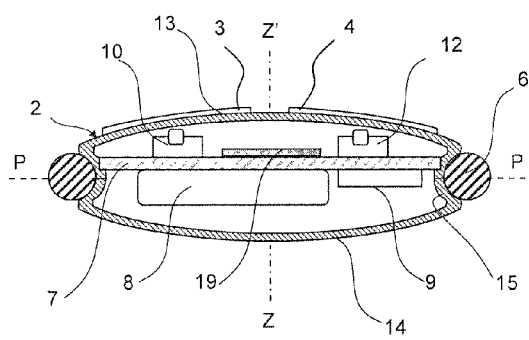
FIG. 2 shows the roaming remote control according to a first cutting plane.

FIG. 2 shows the roaming remote control according to a first cutting plane XX' perpendicular to the plane of FIG. 1. The housing 2 has a symmetry of revolution about an axis of revolution ZZ'. It comprises a first top shell 13 and a first bottom shell 14 connected along a connection plane P perpendicular to the axis of revolution. The means for fixing the two half-shells together are not shown in the various figures, but can be taken from the various means known from the state of the art (snap-fitting, shape cooperation, etc.). Overall, the two shells form a sphere that is flattened on the axis of revolution. An arrangement is, however, provided at the periphery of the shells: said shells are connected at their periphery, along an external connection line L, forming a groove of revolution 15, parallel to the connection plane P, into which the viscoelastic ring 6 is inserted. The groove of revolution 15 thus makes it possible to secure the ring 6 sufficiently to require a deliberate extraction force in order to remove the latter from the groove 15. Furthermore, the inner diameter of the viscoelastic ring 6, when not fitted, is equal to or slightly less than the diameter delimited by the bottom of the groove 15 so as to provide a light grip. The viscoelastic ring 6 is thus held elastically against the housing. The ring also covers the external line of connection of the two shells: this is to prevent any inopportune dismantling and at the same time protects this line of connection of the two shells against the ingress of water or any dirt.

Figure 3:
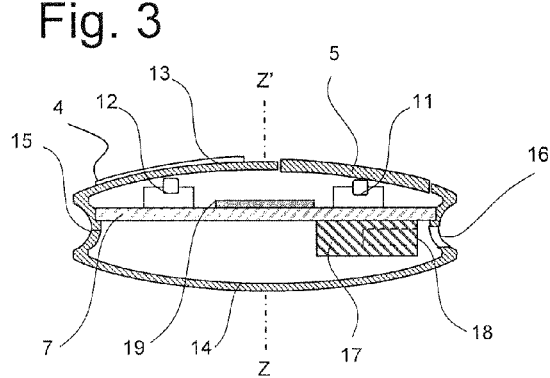
FIG. 3 shows the roaming remote control according to a second cutting plane.

FIG. 3 shows the roaming remote control 1 according to a second cutting plane YY' perpendicular to the plane of FIG. 1.

The roaming remote control comprises an electronic circuit 7 supporting a primary battery cell 8 and a radiofrequency transmitter 9. Also mounted on the electronic circuit 7 are a first switch 10, a second switch 11 and a third switch 12 which can be activated respectively by the control keys 3, 4, 5. A printed antenna 19 is also positioned on the electronic circuit 7. This antenna is connected to the radiofrequency transmitter 9. A female-type USB connector 17 is also positioned on the electronic circuit and terminals 18 of this connector are connected to the electronic circuit. The terminals are positioned in front of an opening 16 in the housing, normally concealed by the viscoelastic ring 6.

The opening in the housing may be produced in one of the two shells of the housing or be formed by a cut-out opening into one or both of the shells.

Thus, and as represented in the figures, the term "opening in the housing" should be understood to mean an area of the housing where the two shells are not joined, that is to say, an area where the connection line between the two shells is interrupted or divided. The connection of the two shells itself does not therefore correspond to an opening within the meaning of the present invention.

The viscoelastic ring 6 therefore serves both to protect the roaming remote control in the event of impact, but also to protect the USB connector. Furthermore, the ring makes it easy to customize a number of roaming remote controls, simply by a choice of colors for each ring. The fitting of the ring is made easier by the form of revolution of the housing of the roaming remote control.

Figure 4:
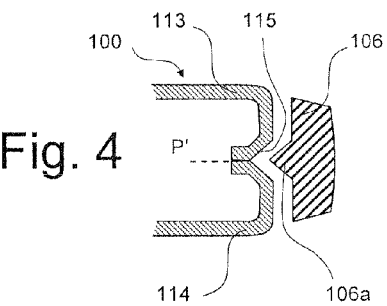
FIG. 4 shows partially in cross section a first variant of the roaming remote control.

FIG. 4 shows a partial cross-sectional view of a first variant 100 of the roaming remote control 1, through a cross section similar to that of FIG. 2. In this variant, a second top shell 113 and a second bottom shell 114 have an overall cylindrical shape and are connected roughly at the level of a generatrix surface of the cylinder, but with a groove of revolution 115 provided. The connection is made along a connection plane P', perpendicular to the axis of revolution. The groove of revolution 115 may be produced by a bevel on each shell, allowing the shells to be removed simply from their molds when they are manufactured. The bottom of the groove of revolution 115 contains the external connection line L. In this embodiment, a viscoelastic ring 106 has a substantially trapezoidal section, but includes a protuberance 106*a* complementing the groove of revolution 115. The groove of revolution 115 can thus secure the ring 106 sufficiently to require a deliberate extraction force in order to insert the latter into or remove it from the groove. The inner diameter of the viscoelastic ring, when not fitted, is, furthermore, equal to or slightly less than the diameter delimited by the bottom of the groove 115 so as to produce a light grip. The viscoelastic ring is thus held elastically against the housing formed by the two shells.

Figure 5:
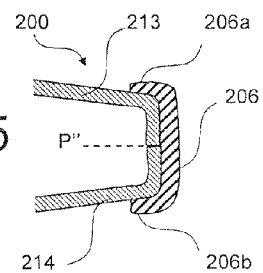
FIG. 5 shows partially in cross section a second variant of the roaming remote control.

FIG. 5 shows a partial cross-sectional view of a second variant 200 of the roaming remote control, through a cross section similar to that of FIG. 2. In this variant, a third top shell 213 and a third bottom shell 214 have an overall cylindrical shape and are connected roughly at the level of a generatrix surface of the cylinder, with, at their outer periphery, the external connection line L. The two shells form the housing. This time, the connection is made on a connection plane P''', perpendicular to the axis of revolution, without any groove of revolution.

A viscoelastic ring 206 has a substantially concave section on the side in contact with the housing, whereas it has a substantially convex section on the side external to the housing. Furthermore, the height of the viscoelastic ring is sufficient to provide an overlap (206*a*, 206*b*) on each of the shells (213, 214).

In the connection plane, the inner diameter of the viscoelastic ring, when not fitted, is slightly less than the outer diameter of the shells so as to provide a light grip. The viscoelastic ring is thus held elastically against the housing.

Figure 6:
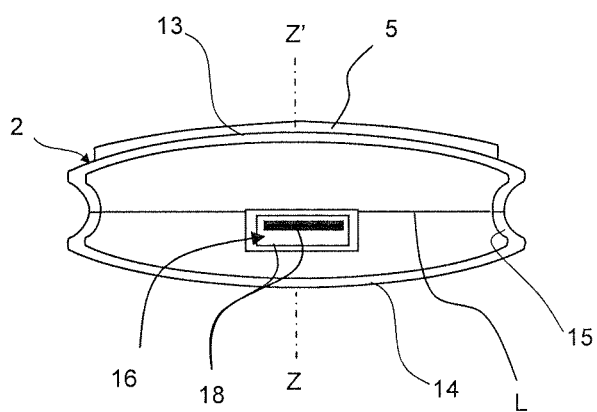
FIG. 6 shows a side view of a roaming remote control according to the invention, FIG. 7 diagrammatically shows a partial cross section of the remote control provided with a viscoelastic ring including a secondary antenna.

FIG. 6 shows a view of the housing of the remote control from the point of view diagrammatically represented by arrow A in FIG. 1, when the ring 6 is removed.

In this figure, the opening 16 and the terminals 18 of the connector 17 can be seen. The external connection line between the two shells is interrupted at the opening 16, the latter being delimited by a cut-out on the bottom shell of the housing and by an edge of the top shell.

Figure 7:
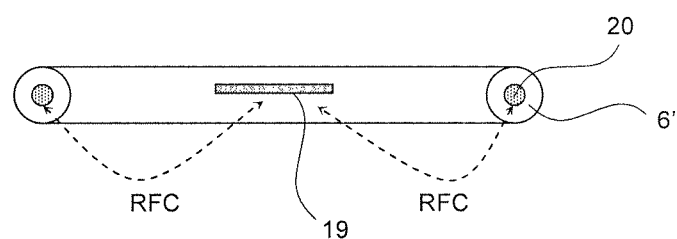

FIG. 7 diagrammatically shows a partial cross section of the remote control provided with a specific ring 6' including a secondary antenna 20.

A secondary antenna, for example as described in the patent FR 2 724 263, is produced by an open turn, having both an inductance and a capacitance such that it resonates at the carrier wave frequency of the radiofrequency transmitter. Advantageously, the loop antenna is produced by a conductive spiral spring. There is then a magnetic coupling RFC between the printed antenna 19 and the secondary antenna 20. Because of this, the range of the transmitter is substantially increased. The use of a specific ring rather than a standard viscoelastic ring thus makes it possible to enhance the communication performance of the remote control in order, for example, to convert a localized control into a general control.

The invention claimed is:

1. A remote control device for home automation equipment, of the roaming type, comprising:
   a housing containing an electronic circuit comprising a radiofrequency transmitter; said housing being of substantially cylindrical or spherical shape and having an axis of revolution, and
   a viscoelastic ring having the same axis of revolution as that of said housing, and being held elastically against said housing and concealing an opening in said housing,
   wherein said opening gives access to the terminals of a connector connected to said electronic circuit.

2. The control device as claimed in claim 1, wherein the outer diameter of said viscoelastic ring is greater than the outer diameter of said housing.

3. The control device as claimed in claim 1, wherein said viscoelastic ring has a U-shaped section covering the area of join between said top shell and said bottom shell.

4. The control device as claimed in claim 1, wherein said housing comprises a top shell and a bottom shell connected along a connection plane perpendicular to the axis of revolution and control keys positioned on said top shell.

5. A remote control device for home automation equipment, of the roaming type, comprising:
   a housing containing an electronic circuit comprising a radiofrequency transmitter; said housing being of substantially cylindrical or spherical shape and having an axis of revolution, and
   a viscoelastic ring having the same axis of revolution as that of said housing, and being held elastically against said housing and concealing an opening in said housing,
   wherein said viscoelastic ring is held in a groove of revolution of said housing.

6. The control device as claimed in claim 5, wherein said viscoelastic ring has a section including a protuberance complementing said groove of revolution.

7. The control device as claimed in claim 5, wherein said groove of revolution is located on either side of a connection plane.

8. A remote control device for home automation equipment, of the roaming type, comprising:
   a housing containing an electronic circuit comprising a radiofrequency transmitter; said housing being of substantially cylindrical or spherical shape and having an axis of revolution, and
   a viscoelastic ring having the same axis of revolution as that of said housing, and being held elastically against said housing and concealing an opening in said housing,
   wherein said electronic circuit comprises a printed antenna, and wherein said viscoelastic ring comprises at least one conductive turn portion that constitutes a secondary antenna magnetically coupled with said printed antenna.

* * * * *